United States Patent
Les et al.

(10) Patent No.: US 12,146,529 B2
(45) Date of Patent: Nov. 19, 2024

(54) PLANAR BEARING JOINT WITH ROBUST SEAL

(71) Applicant: GM GLOBAL TECHNOLOGY OPERATIONS LLC, Detroit, MI (US)

(72) Inventors: Anderson Les, Rochester Hills, MI (US); Victor Wong, Lake Orion, MI (US); Jeffry J. Pniewski, Metamora, MI (US); Marcelo Augusto Goncalves Fonseca, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 197 days.

(21) Appl. No.: 18/084,136

(22) Filed: Dec. 19, 2022

(65) Prior Publication Data

US 2024/0200608 A1    Jun. 20, 2024

(51) Int. Cl.
*F16C 35/02* (2006.01)
*F16C 33/74* (2006.01)
*B60G 7/00* (2006.01)

(52) U.S. Cl.
CPC .............. *F16C 35/02* (2013.01); *F16C 33/74* (2013.01); *B60G 7/00* (2013.01); *B60G 7/008* (2013.01); *B60G 2204/418* (2013.01)

(58) Field of Classification Search
CPC ........ F16C 11/045; F16C 17/26; F16C 17/10; F16C 17/02; F16C 17/04; F16C 33/74; F16C 35/02; Y10T 403/32983; B60G 7/00; B60G 7/008; B60G 2204/418
See application file for complete search history.

(56) References Cited

U.S. PATENT DOCUMENTS

| | | | | |
|---|---|---|---|---|
| 1,592,665 A | * | 7/1926 | Janette | F16C 17/04 384/426 |
| 4,439,050 A | * | 3/1984 | Garner | E21B 10/22 384/100 |
| 5,317,793 A | * | 6/1994 | Boyd | F16C 33/08 29/281.1 |
| 5,363,543 A | * | 11/1994 | Boyd | F16C 11/045 29/244 |

(Continued)

FOREIGN PATENT DOCUMENTS

| | | | | |
|---|---|---|---|---|
| CN | 107719054 A | * | 2/2018 | ............... B60G 7/00 |
| CN | 115008959 A | * | 9/2022 | |

(Continued)

*Primary Examiner* — Drew J Brown
*Assistant Examiner* — Maxwell L Meshaka

(57) ABSTRACT

A planar joint for pivotally supporting an arm to a support structure includes an outer sleeve with a shaft extending through the outer sleeve and including an integrated washer extending radially outward from a central portion thereof. A pair of thrust bearings disposed against the integrated washer on respective opposite sides. A pair of bearing sleeves are adjacent to a respective one of the pair of thrust bearings. A pair of threaded washers are threadedly engaged within respective opposite ends of the outer sleeve. A pair of seals are received in a cavity in a respective one of the pair of threaded washers. A pair of retaining rings are received in an opening end of the cavity of a respective one of the pair of threaded washers for securing the seals within the respective threaded washers.

20 Claims, 3 Drawing Sheets

(56) References Cited

U.S. PATENT DOCUMENTS

| | | | | |
|---|---|---|---|---|
| 5,404,631 A * | 4/1995 | Boyd | ............... | F16C 11/045 |
| | | | | 29/263 |
| 6,808,333 B2 * | 10/2004 | Friesen | ............... | F16C 35/00 |
| | | | | 403/150 |
| 7,377,712 B1 * | 5/2008 | Johnson | ............... | F16M 11/06 |
| | | | | 403/360 |
| 8,087,844 B2 * | 1/2012 | Turner | ............... | A01K 91/04 |
| | | | | 403/DIG. 1 |
| 8,261,413 B2 * | 9/2012 | Su | ............... | H01F 7/0231 |
| | | | | 16/386 |
| 9,238,391 B1 * | 1/2016 | Luttinen | ............... | B60G 17/025 |
| 10,408,256 B2 * | 9/2019 | Sakurai | ............... | F16C 9/02 |
| 11,306,726 B2 * | 4/2022 | Perevozchikov | ............... | F04D 29/60 |
| 11,454,275 B2 * | 9/2022 | Drabon | ............... | F16C 17/02 |
| 12,025,180 B2 * | 7/2024 | Johnston | ............... | F16C 33/046 |
| 2002/0025218 A1 * | 2/2002 | Tan | ............... | H01B 17/145 |
| | | | | 403/322.4 |
| 2004/0086325 A1 * | 5/2004 | Friesen | ............... | F16C 35/00 |
| | | | | 403/150 |
| 2011/0154716 A1 * | 6/2011 | Turner | ............... | A01K 91/04 |
| | | | | 43/43.13 |
| 2014/0112700 A1 * | 4/2014 | Carrere | ............... | F16C 7/02 |
| | | | | 403/41 |
| 2016/0016448 A1 * | 1/2016 | Luttinen | ............... | B60G 11/181 |
| | | | | 280/5.514 |
| 2018/0187717 A1 * | 7/2018 | Drabon | ............... | F16C 33/20 |
| 2018/0355907 A1 * | 12/2018 | Sakurai | ............... | F16C 33/103 |
| 2019/0126703 A1 * | 5/2019 | Gonul | ............... | B60G 3/20 |
| 2020/0291953 A1 * | 9/2020 | Perevozchikov | ............... | F25B 31/006 |
| 2022/0235817 A1 * | 7/2022 | Johnston | ............... | F16C 27/02 |
| 2023/0091889 A1 * | 3/2023 | Turner | ............... | B60C 23/00336 |
| | | | | 301/5.24 |
| 2024/0200608 A1 * | 6/2024 | Les | ............... | F16C 11/0614 |

FOREIGN PATENT DOCUMENTS

| | | | | |
|---|---|---|---|---|
| DE | 102019005655 A1 * | 2/2020 | | |
| KR | 101340366 B1 * | 12/2013 | | |
| WO | WO-2019119091 A1 * | 6/2019 | | |
| WO | WO-2020098855 A1 * | 5/2020 | ............ | F16C 23/043 |
| WO | WO-2024061388 A1 * | 3/2024 | | |

* cited by examiner

PLANAR BEARING JOINT WITH ROBUST SEAL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a planar bearing joint with a robust seal.

Planar joints are used for sliding, rotating, oscillating, or reciprocating motion, for industrial and automotive applications. Planar joints are not common in suspension applications because they are not designed to resist to axial or conical loads, or to resist dust and debris under severe applications.

SUMMARY

According to an aspect of the present disclosure, a planar joint assembly for pivotally supporting an arm to a support structure includes an outer sleeve with a hollow shaft extending through the outer sleeve, the hollow shaft including an integrated washer extending radially outward from a central portion thereof. A pair of bearing sleeves are disposed on opposite sides of the integrated washer. A pair of threaded washers are threadedly engaged within respective opposite ends of the outer sleeve. A seal system is received in a cavity in each of the pair of threaded washers. A pair of retaining rings are received in an opening end of the cavity of a respective one of the pair of threaded washers for securing the seals within the respective threaded washers.

According to a further aspect, a pair of thrust bearings are disposed against the integrated washer on respective opposite sides.

According to another aspect of the present disclosure, the pair of thrust bearings are self-lubricated.

According to yet another aspect of the present disclosure, the pair of bearing sleeves are self-lubricated.

According to another aspect of the present disclosure, the seal system includes a first seal including a lip seal.

According to another aspect of the present disclosure, the lip seal is made from PTFE or a similar material appropriate for the intended environment of use.

According to another aspect of the present disclosure, the first seals include a garter spring or a similar solution disposed against the lip seal.

According to another aspect of the present disclosure, the seal system includes a second seal that includes a felt seal.

According to another aspect of the present disclosure, the retaining ring is threadably engaged with the respective one of the pair of threaded washers.

According to yet another aspect, a vehicle suspension system includes a vehicle structure and a suspension arm pivotally connected to the vehicle structure via a planar joint assembly. The planar joint assembly including an outer sleeve received in an opening in the suspension arm and with a hollow shaft extending through the outer sleeve and including an integrated washer extending radially outward from a central portion thereof. The hollow shaft being supported by the vehicle structure by a bolt extending through the hollow shaft. A pair of bearing sleeves are adjacent to a respective one of the pair of thrust bearings. A pair of threaded washers are threadedly engaged within respective opposite ends of the outer sleeve. A seal system is received in a cavity in each of the pair of threaded washers. A pair of retaining rings are received in an opening end of the cavity of a respective one of the pair of threaded washers for securing the seal systems within the respective threaded washers.

A joint system includes a support structure and an arm pivotally connected to the support structure via a planar joint assembly, the planar joint assembly including: an outer sleeve received in an opening in the arm and having an interior opening extending therethrough. A hollow shaft extends through the interior opening of the outer sleeve and includes an integrated washer extending radially outward from a central portion thereof. The hollow shaft is supported by the support structure by a bolt extending through the hollow shaft. A pair of bearing sleeves are adjacent to a respective one of the pair of thrust bearings. A pair of threaded washers are threadedly engaged within respective opposite ends of the outer sleeve. A seal system is received in a cavity in each of the pair of threaded washers. A pair of retaining rings are received in an opening end of the cavity of a respective one of the pair of threaded washers for securing the seals within the respective threaded washers.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
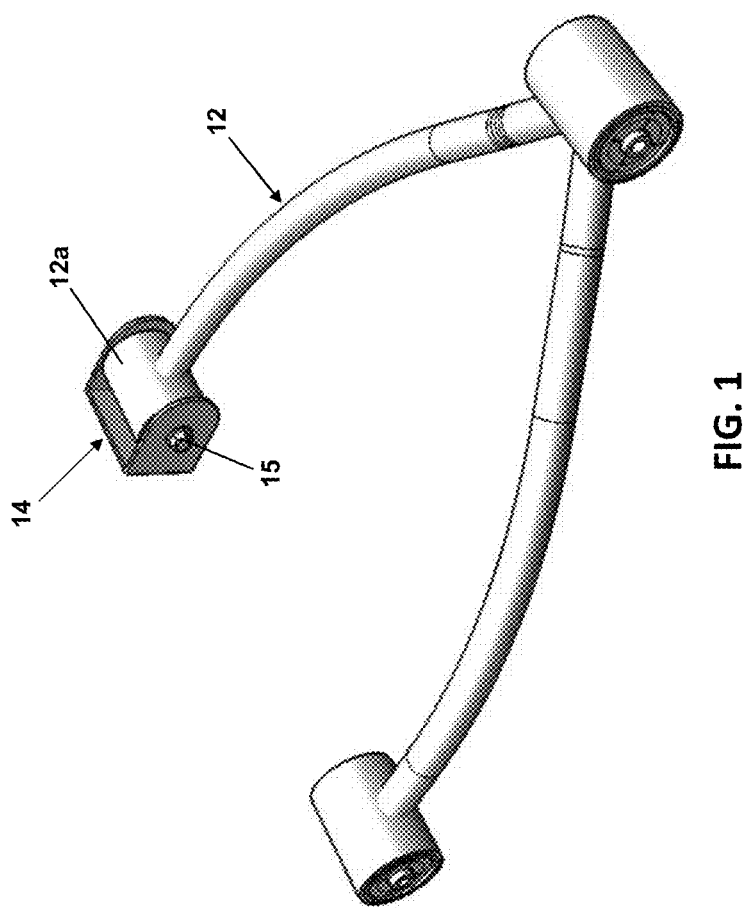
FIG. 1 is a perspective view of a component of a vehicle suspension system mounted to a vehicle structure via a planar bearing joint assembly according to the principles of the present disclosure.

With reference to FIG. 1, a portion of a vehicle suspension system 10 is shown including a suspension arm 12 pivotally connected to a vehicle structure/bracket 14 via a planar joint assembly 16. The planar joint assembly 16 can be press fit in an opening in a cylindrical pivot 12*a* of the suspension arm 12 and is further supported by the vehicle structure 14 by a bolt 15.

Figure 2:
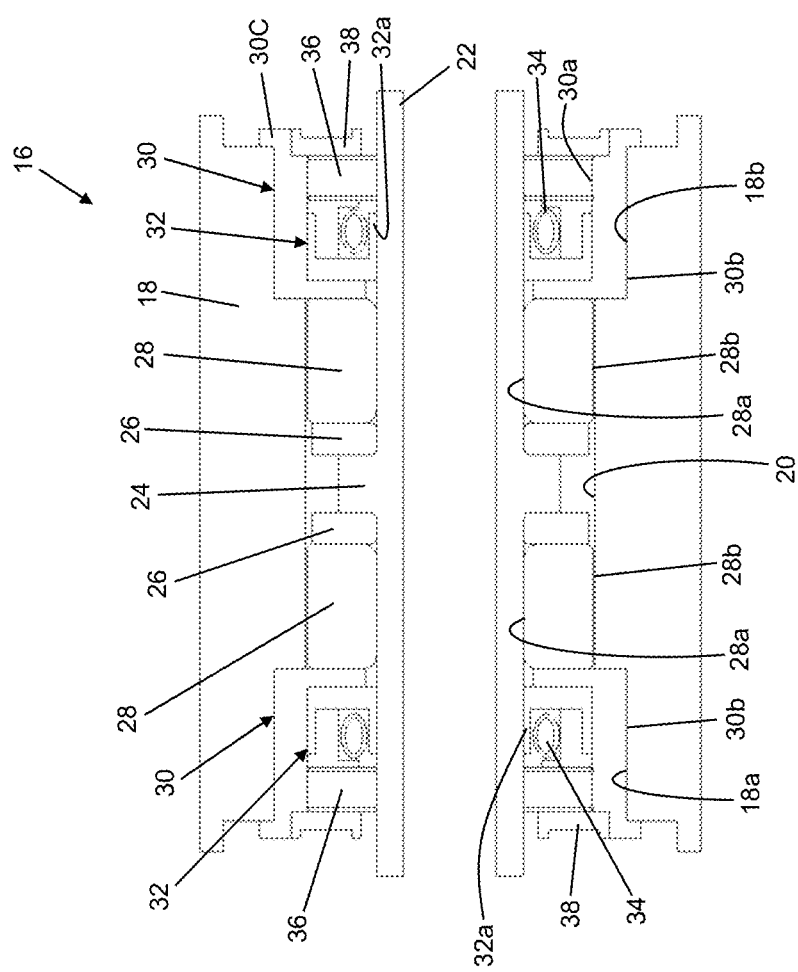
FIG. 2 is a cross-sectional view of the planar joint assembly according to the principles of the present disclosure.

With reference to FIG. 2, the planar joint assembly 16 includes an outer sleeve 18 having an interior opening 20 extending therethrough. A hollow shaft 22 extends through the interior opening 20 of the outer sleeve 18 and includes an integrated washer or flange 24 extending radially outward from a central portion thereof. The hollow shaft 22 can be formed from metal such as, but not limited to, aluminum or steel.

A pair of self-lubricated thrust bearings 26 are disposed against the integrated washer 24 on respective opposite sides of the integrated washer 24. The thrust bearings 26 can be made from metal, plastic, or fiber reinforced composite material that is impregnated by a lubricant. A pair of self-lubricated planar bearings 28 are each adjacent to a respective one of the pair of thrust bearings 26. The planar bearings 28 include an inner diameter surface 28a that engages the shaft and an outer diameter surface 28b that engages an interior surface of the sleeve 18. The planar bearings 28 are laterally spaced for improved load distribution and are assembled on the shaft 22 with the central integrated washer 24 that absorbs axial and conical loads. The thrust bearings 26 allow the shaft 22 to spin without increasing the torsional torque (binding). The planar bearings 28 can be made from metal, plastic or a fiber reinforced composite material that are impregnated by a lubricant.

A pair of threaded washers 30 are threadedly engaged within respective opposite internally threaded ends 18a, 18b of the outer sleeve 18. The pair of threaded washers 30 each include an interior cavity 30a within a cylindrical wall section 30b and a radially extending flange 30c extending from an end of the cylindrical wall section 30b.

Figure 3:
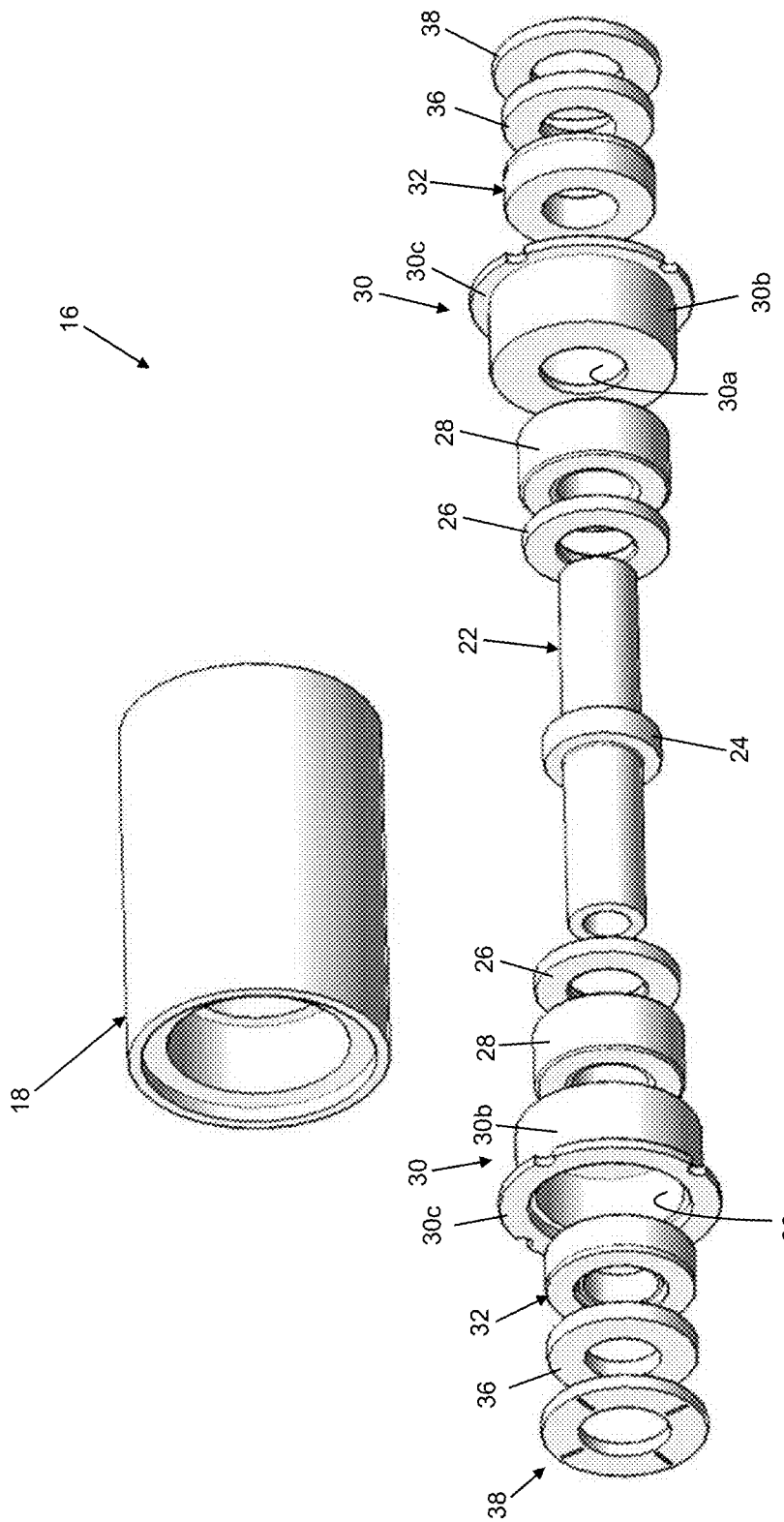
FIG. 3 is an exploded perspective view of the components of the planar joint assembly according to the principles of the present disclosure.

With reference to FIGS. 2-3, a pair of first seals 32 are each received in an inboard end of the cavity 30a in a respective one of the pair of threaded washers 30. The pair of first seals 32 can include a lip seal 32a made from PTFE or other appropriate material. A garter spring 34 can be used to bias the lip seal 32a against the shaft 22. In addition, a pair of second seals 36 are each received in an outboard end of the cavity 30a in the respective ones of the pair of threaded washers 30. The pair of second seals 36 can include a felt ring or other appropriate seal that packs the outboard end of the cavity 30a. A pair of retaining rings 38 are threadably received in a threaded interior of the opening end of the cavity 30a of a respective one of the pair of threaded washers 30. The retaining rings 38 secure the first pair of seals 32 and the second pair of seals 36 within the cavity 30a of the respective threaded washers 30. The felt seals 36 provide a first barrier against dust particles and the PTFE seals 32 prevent small dust particles inside of the joint.

Although the planar joint assembly is shown and described with a vehicle suspension system, it should be understood that the planar joint assembly can be utilized in non-vehicular applications where an arm is pivotally connected to a support structure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A planar joint assembly for pivotally supporting an arm to a support structure, comprising:
   an outer sleeve having an interior opening extending therethrough;
   a shaft extending through the interior opening of the outer sleeve and including an integrated washer extending radially outward from a central portion thereof;
   a pair of bearing sleeves each adjacent to a respective one of a pair of thrust bearings and engaging the shaft on an inner diameter surface and engaging the outer sleeve on an outer diameter surface;
   a pair of threaded washers threadedly engaged within respective opposite ends of the outer sleeve;
   a seal system received in a cavity in each of the pair of threaded washers; and
   a pair of retaining rings received in an opening end of the cavity of a respective one of the pair of threaded washers and securing the seal system within the respective threaded washers.

2. The planar joint assembly according to claim 1, further comprising the pair of thrust bearings, each of the pair of thrust bearings being disposed against the integrated washer on respective opposite sides of the integrated washer.

3. The planar joint assembly according to claim 2, wherein the pair of bearing sleeves and the pair of thrust bearings are self-lubricated.

4. The planar joint assembly according to claim 1, wherein the seal system includes a first pair of seals disposed in respective ones of the pair of threaded washers and the first pair of seals include a lip seal.

5. The planar joint assembly according to claim 4, wherein the lip seal is made from PTFE.

6. The planar joint assembly according to claim 4, wherein first pair of seals include a garter spring disposed against the lip seal.

7. The planar joint assembly according to claim 1, wherein the seal system includes a second pair of seals disposed in respective ones of the pair of threaded washers and the second pair of seals include a felt seal.

8. The planar joint assembly according to claim 1, wherein the retaining ring is threadably engaged with the respective one of the pair of threaded washers.

9. A vehicle suspension system, comprising:
   a vehicle structure;
   a suspension arm pivotally connected to the vehicle structure via a planar joint assembly, the planar joint assembly including:
   an outer sleeve received in an opening in the suspension arm and having an interior opening extending therethrough;

a shaft extending through the interior opening of the outer sleeve and including an integrated washer extending radially outward from a central portion thereof;

a pair of bearing sleeves each adjacent to a respective one of the pair of thrust bearings and engaging the shaft on an inner diameter surface and engaging the outer sleeve on an outer diameter surface;

a pair of threaded washers threadedly engaged within respective opposite ends of the outer sleeve;

a seal system received in a cavity in each of the pair of threaded washers; and a pair of retaining rings received in an opening end of the cavity of a respective one of the pair of threaded washers and securing seal system within the respective threaded washers.

10. The vehicle suspension system according to claim 9, further comprising a pair of thrust bearings, each of the pair of thrust bearings being disposed against the integrated washer on respective opposite sides of the integrated washer.

11. The vehicle suspension system according to claim 10, wherein the pair of bearing sleeves and the pair of thrust bearings are self-lubricated.

12. The vehicle suspension system according to claim 9, wherein the seal system includes a first pair of seals each disposed in a respective one of the threaded washers, the first pair of seals include a lip seal.

13. The vehicle suspension system according to claim 12, wherein the lip seal is made from PTFE.

14. The vehicle suspension system according to claim 12, wherein first pair of seals include a garter spring disposed against the lip seal.

15. The vehicle suspension system according to claim 12, wherein the seal system includes a second pair of seals each disposed in a respective one of the threaded washers, the second pair of seals include a felt seal.

16. The vehicle suspension system according to claim 9, wherein the retaining ring is threadably engaged with the respective one of the pair of threaded washers.

17. A joint system, comprising:

a support structure;

an arm pivotally connected to the support structure via a planar joint assembly, the planar joint assembly including:

an outer sleeve received in an opening in the suspension arm and having an interior opening extending therethrough;

a shaft extending through the interior opening of the outer sleeve and including an integrated washer extending radially outward from a central portion thereof;

a pair of bearing sleeves each adjacent to a respective one of the pair of thrust bearings and engaging the shaft on an inner diameter surface and engaging the outer sleeve on an outer diameter surface;

a pair of threaded washers threadedly engaged within respective opposite ends of the outer sleeve;

a seal system received in a cavity in each of the pair of threaded washers; and a pair of retaining rings received in an opening end of the cavity of a respective one of the pair of threaded washers and securing seal system within the respective threaded washers.

18. The vehicle suspension system according to claim 17, further comprising a pair of thrust bearings, each of the pair of thrust bearings being disposed against the integrated washer on respective opposite sides of the integrated washer.

19. The vehicle suspension system according to claim 18, wherein the pair of bearing sleeves and the pair of thrust bearings are self-lubricated.

20. The vehicle suspension system according to claim 17, wherein the seal system includes a lip seal and a felt seal disposed in the cavity in each of the pair of threaded washers.

* * * * *